US006852061B2

(12) United States Patent
Schoon

(10) Patent No.: US 6,852,061 B2
(45) Date of Patent: Feb. 8, 2005

(54) PLANETARY GEARBOX WITH INTEGRAL ELECTRIC MOTOR AND STEERING MEANS.

(76) Inventor: Benjamin Warren Schoon, 2408 Crestview Ct., Lafayette, IN (US) 47909

( * ) Notice: Subject to any disclaimer, the term of this patent is extended or adjusted under 35 U.S.C. 154(b) by 0 days.

(21) Appl. No.: 10/261,064

(22) Filed: Sep. 30, 2002

(65) Prior Publication Data
US 2004/0214680 A1 Oct. 28, 2004

(51) Int. Cl.[7] .......................... B60K 7/00; B60K 17/14
(52) U.S. Cl. ...................... 475/348; 180/65.5; 180/65.6
(58) Field of Search .......................... 475/5, 331, 348, 475/903; 180/65.1, 65.5, 65.6, 65.7, 308

(56) References Cited

U.S. PATENT DOCUMENTS

| | | |
|---|---|---|
| 2,726,726 A | 12/1955 | Le Tourneau |
| 3,161,249 A | 12/1964 | Bouladon et al. |
| 3,163,250 A | 12/1964 | Gibson |
| 3,370,668 A | 2/1968 | Goodacre |
| 3,704,759 A | 12/1972 | Vitkov et al. |
| 3,812,928 A | 5/1974 | Rockwell et al. |
| 3,865,203 A | 2/1975 | Hibma |
| 3,892,300 A * | 7/1975 | Hapeman et al. .......... 180/65.5 |
| 4,088,202 A | 5/1978 | Costello |
| 4,116,293 A | 9/1978 | Fukui |
| 4,330,045 A * | 5/1982 | Myers ....................... 180/65.5 |
| 4,380,274 A * | 4/1983 | Abraham et al. ........... 180/308 |
| 4,930,590 A | 6/1990 | Love et al. |
| 5,087,229 A | 2/1992 | Hewko et al. |
| 5,322,141 A | 6/1994 | Brunner et al. |
| 5,685,798 A | 11/1997 | Lutz et al. |
| 5,813,488 A * | 9/1998 | Weiss ....................... 180/65.6 |
| 6,367,571 B1 | 4/2002 | Schwarz |
| 6,386,553 B2 * | 5/2002 | Zetterstrom ........... 180/65.5 X |

FOREIGN PATENT DOCUMENTS

JP 404185531 * 7/1992 ................ 180/65.5

* cited by examiner

Primary Examiner—Ha Ho

(57) ABSTRACT

A new, useful and compact wheel motor drive arrangement for applications on such construction equipment as scissor lifts and other similar scaffolding equipment where hydraulically driven systems have historically been used to provide power to the wheels to move the equipment is disclosed. An electric motor is mounted to a spindle bracket which is pivotably connected to the frame of the equipment to allow the unit to be pivoted around a vertical axis for steering purposes. A gear reducing planetary gear system is mounted around the drive shaft of the motor is positioned totally within the rotating wheel hub. The output ring gear of the planetary gear system is integrally formed to the interior of the wheel hub so that there is a direct application through the planetary gear system to the wheel hub to provide greater efficiency.

10 Claims, 3 Drawing Sheets

PLANETARY GEARBOX WITH INTEGRAL ELECTRIC MOTOR AND STEERING MEANS.

BACKGROUND OF THE INVENTION

Field of the Invention

This invention relates generally to electrical wheel motor drive systems for construction equipment and more particularly for small, compact construction equipment such as scissor lifts and scaffolding. More particularly, this invention combines a planetary gear box, an electrical motor and steering arm into one compact package which allows the wheel motor to act as both the drive wheel and steering wheel for the equipment.

SUMMARY OF THE INVENTION

The present invention comprises a useful and compact wheel motor drive arrangement for applications on such construction equipment as scissor lifts and other similar scaffolding equipment where hydraulically driven systems have historically been used to provide power to the wheels to move the equipment. The invention includes an electric motor mounted to a spindle bracket which is pivotably connected to the frame of the equipment to allow the unit to be pivoted around a vertical axis for steering purposes. A gear reducing planetary gear system is mounted around the drive shaft of the motor which is contained within the rotating wheel hub. The output ring gear of the planetary gear system is integrally formed to the interior of the wheel hub so that there is a direct application through the planetary gear system to the wheel hub to provide greater efficiency.

The present invention provides decided advantages over the low speed hydraulic wheel motors that are presently used to drive such compact scissor lift and other scaffolding equipment used in the construction industry. Hydraulic wheel motors have historically been used for such equipment due to their small size and relatively inexpensive cost. However, such hydraulic motors require an electrical motor and hydraulic pump to drive the hydraulic wheel motors which causes substantial loss of efficiency for the system. The present invention provides a highly efficient compact motor and planetary gear system which is far more efficient than the prior art hydraulic wheel motors, and which provides greater direct power to the wheels than prior art systems.

Historically, electrical motor/gearbox combinations have been too large and too complex to supplant hydraulic wheel motors for small compact scaffold and scissor lift equipment. However, the present invention provides a unique, compact, and efficient arrangement which reduces the overall size while maintaining and increasing the power and efficiency to the drive wheels. Further, present invention allows much quieter operation with the elimination of hydraulic fluid leaks which can cause safety and cleanliness problems at construction sites. The present invention is typically mounted in pairs that are interconnected by a tie bar so that both the wheel motors can be pivoted about the vertical axis of the spindle to permit the steering of the equipment during movement.

Finally, the present invention provides for an automatic locking arrangement which locks the wheels in position any time the power is removed from the motor so that the equipment remains stationary during use.

Thus, it is a primary object of the present invention to provide a compact, efficient electric wheel motor arrangement for scissor lifts and similar scaffolding equipment which can be economically used to eliminate low speed hydraulic wheel motors.

It is yet another object of the present invention to provide a steerable wheel motor for scissor lifts and other scaffolding equipment which can be used both to drive the movement of the equipment as well as steer the equipment during movement.

It is yet another object of the present invention to provide a steerable wheel motor for scissor lifts and other scaffolding equipment which contains an electrically operated brake arrangement that locks the wheels when electrical power is removed from the motor and the wheels are stopped and releases the brake when power is applied to the motor and the wheels are rotated.

These and other obvious advantages and features shall hereinafter appear and for the purposes of illustration, but not for limitation, the following preferred embodiments are described.

DETAILED DESCRIPTION OF THE PREFERRED EMBODIMENTS

Figure 1:
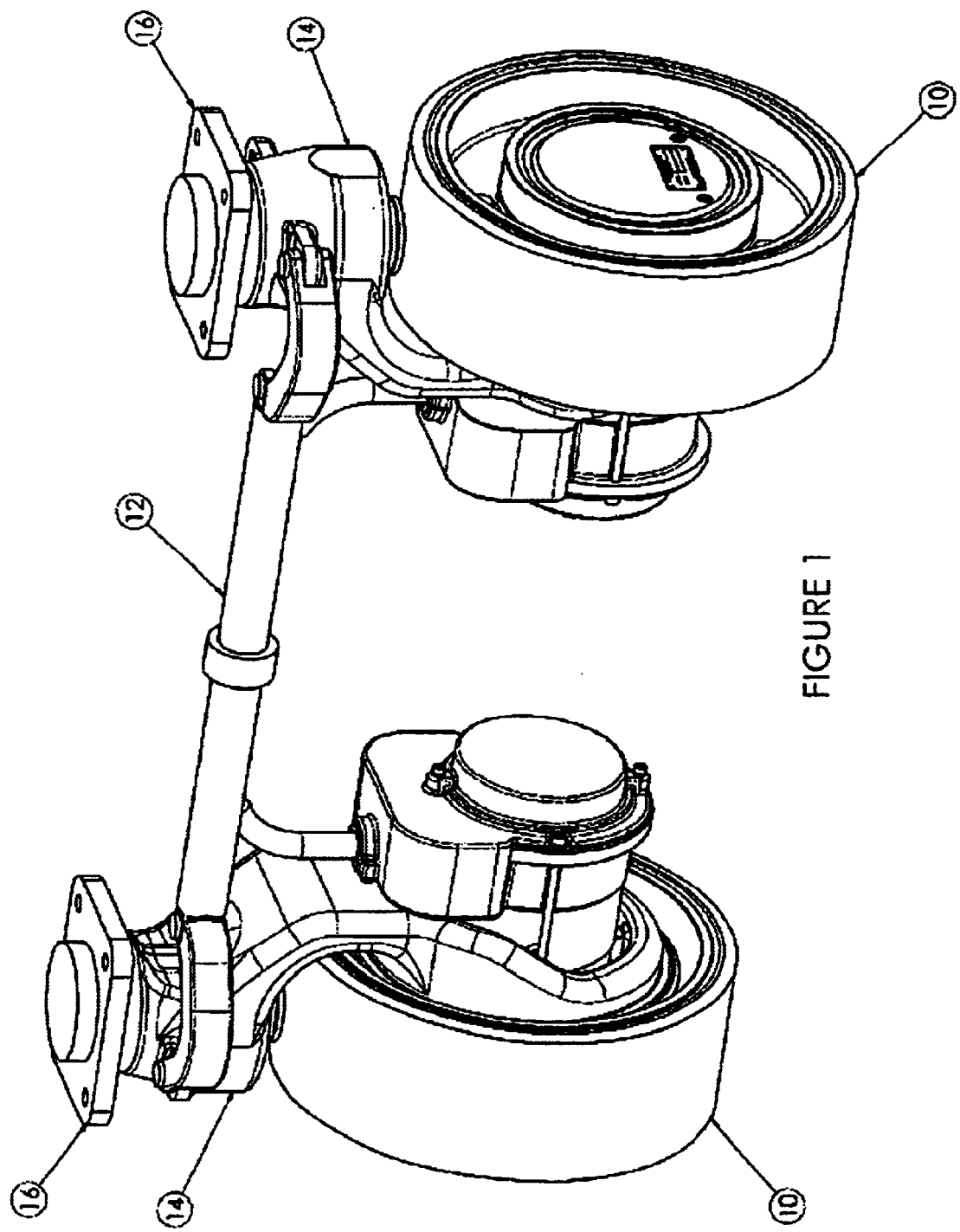
FIG. 1 is a perspective view of a pair of wheel motors in accordance with the present invention interconnected by a tie bar used for steering purposes.

With respect to FIG. 1, two wheel motor assemblies 10 are shown in a paired relationship with an interconnecting tie bar assembly 12 which is pivotably connected at each end to spindle brackets 14. Spindle brackets 14 are pivotably mounted on a shaft (not shown) extending downwardly from brackets 16. Brackets 16 can be mounted to the appropriate undercarriage of the scissor lift or other scaffold equipment (not shown). Tie bar assembly 12 is connected to the steering mechanism of the equipment (not shown) so that the tie bar can be moved laterally to cause the wheel motor assemblies to pivot around the shaft to steer the equipment.

Figure 2:
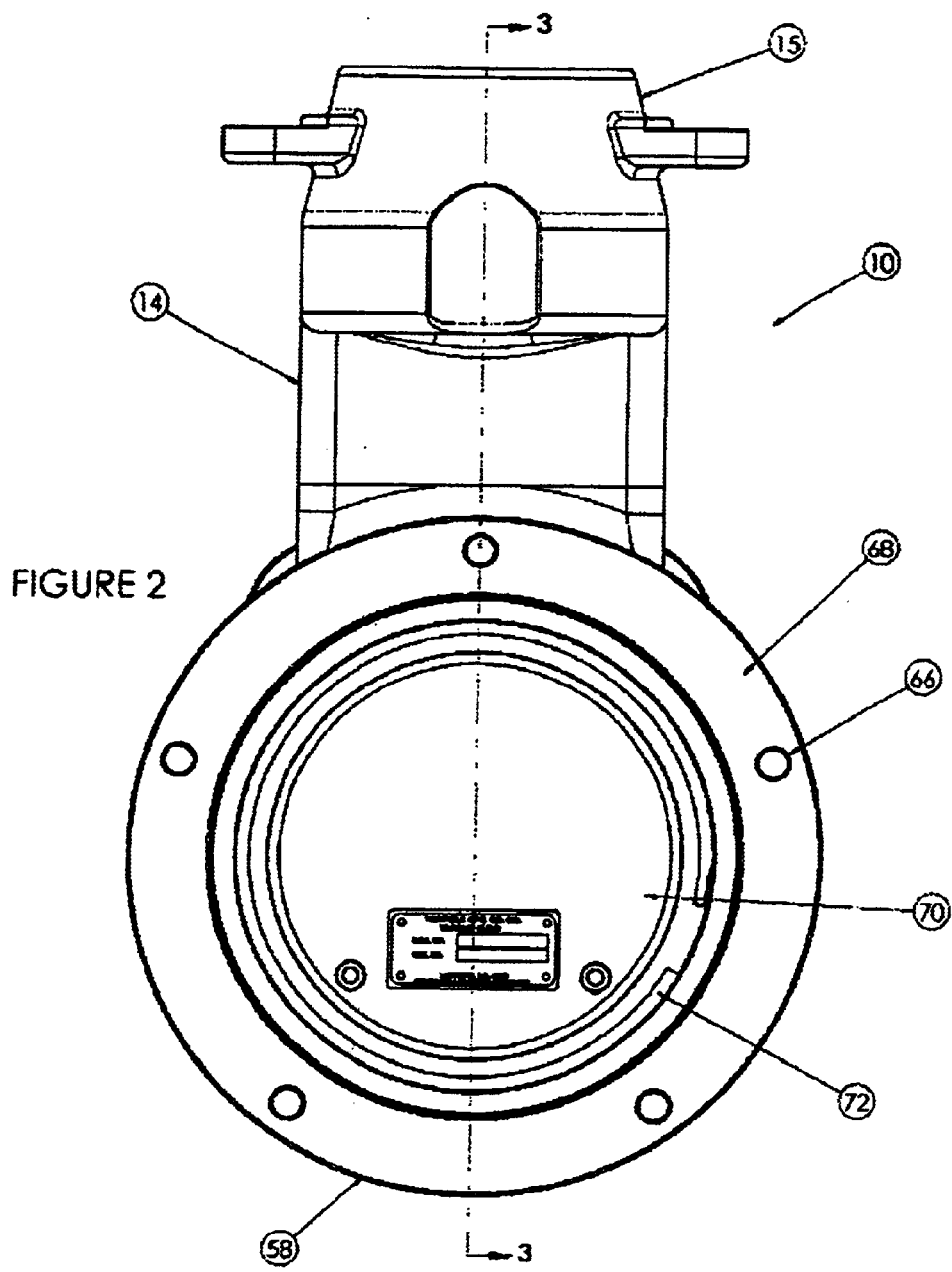
FIG. 2 is a front view of a wheel motor in accordance with the present invention.
Figure 3:
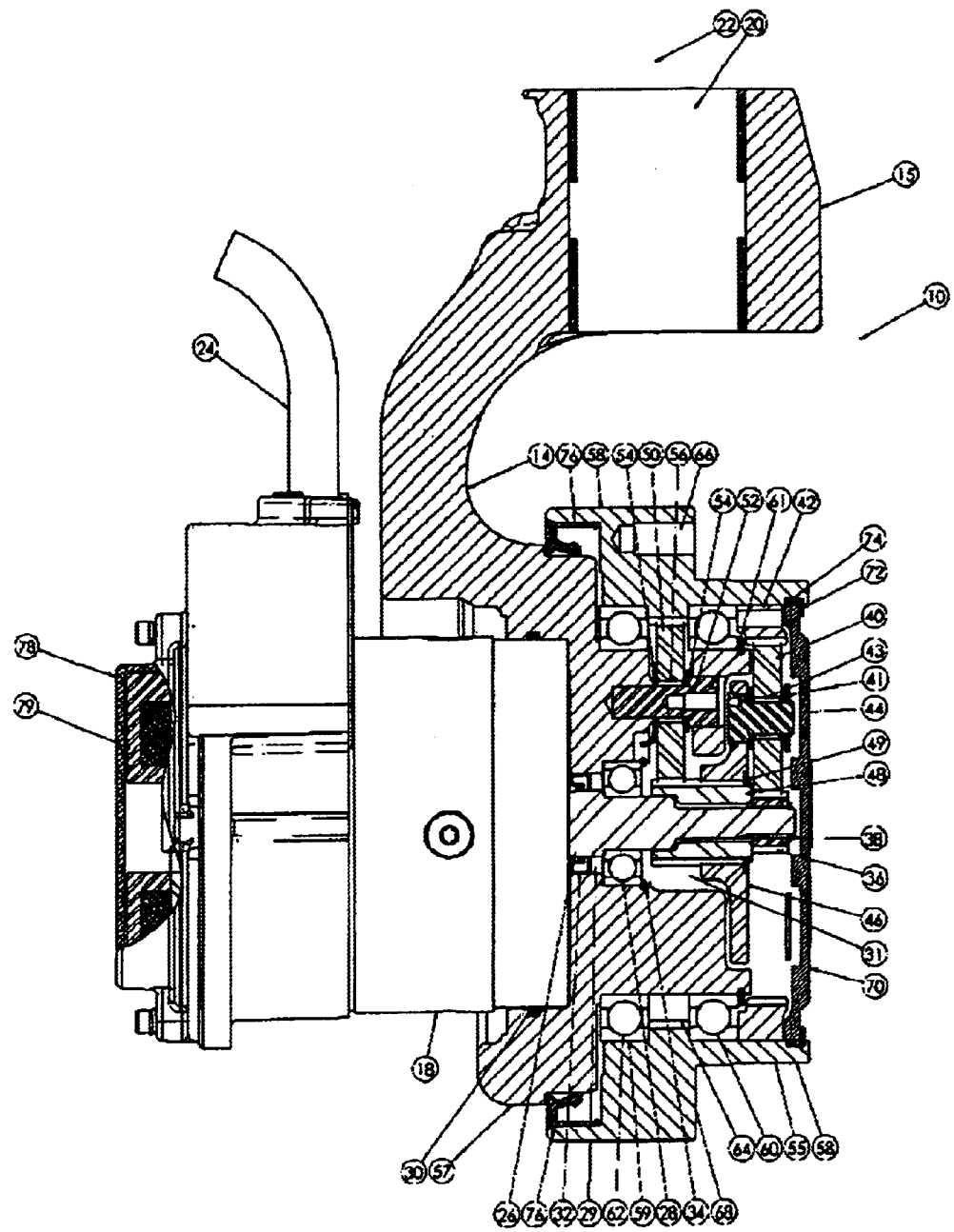
FIG. 3 is a side, partially cross-sectional view taken along line 3—3 in FIG. 2.

With reference to FIGS. 2 and 3, wheel motor assembly 10 comprises spindle bracket 14 to which is mounted motor 18. The upper end 15 of spindle bracket 14 has a hollow cylindrical opening 20 formed throughout which is dimensional to receive the cylindrical shaft (not shown) mounted on bracket 16 so that the spindle bracket 14 can pivot about vertical axis 22.

Electrical power is supplied to motor 18 through electrical cable 24 which is connected to an appropriate power source. The application of electrical power through cable 24 causes output shaft 26 or motor 18 to rotate. Output shaft 26 is supported for rotation by shaft bearing 28 positioned within a circular opening 29 through the lower end 57 of spindle bracket 14. An O-ring seal 30 is provided around the edge of motor 18 to prevent dust and debris from entering the motor compartment and to support the motor 18. Additionally, a shaft lip seal 32 is provided to further seal the shaft 26 to prevent lubricant from exiting and dust and debris from entering the gear compartment 31. Gear compartment 31 comprises a hollow interior portion of the lower end 57 of spindle bracket 14. Shaft bearing 28 is retained in position by a retaining ring 34. Mounted on the end of output shaft 26 is input sun gear 36 which is retained on the end of shaft 26 by a retaining ring 38 which engages a recess on the end of shaft 26. Sun gear 36 comprises a plurality of gear teeth which engage corresponding gear teeth on input planet gears 40 (only one of three shown). A ring gear 42 having a plurality of gear teeth is positioned to engage the teeth of input planet gears 40 so that rotation of the input sun gear 36 causes the input planet gears 40 to rotate within ring gear 42 to cause the input planet gears to circle around sun gear 36. Planet gears 40 are mounted for rotation on input planet pins 44 by lock ring 41, and are supported for rotation about input planet pins 44 by needle bearings 43. Pins 44 are mounted to an input carrier 46 which is joined to output sun gear 48. Input carrier 46 is locked to output sun gear 48 by a locking ring 49. Sun gear 48 is mounted for rotation around shaft 26. Thus, when input planetary gears 40 are caused to circle about sun gear 36 as sun gear 36 rotates, carrier 46 and joined output sun gear 48 are caused to rotate about shaft 26 in the same direction.

Output sun gear 48 has teeth which engage gear teeth on output planet gears 50 which are mounted for rotation to the spindle bracket 14 by output planet pins 52. Thrust washers 54 are provided on each side of output planet gears 50 around pin 52 and needle bearings 56 support the output planet gears 50 for easy rotation.

Mounted for rotation about lower end 57 of spindle bracket 14 is generally cylindrically shaped hub 58. Hub 58 is supported for rotation by bearings 60 and 62. Bearings 60 are retained in position by retaining ring 61. Joined to the interior surface 59 of hub 50 is an output ring gear 64 which engages output planet gears 50. Rotation of the output planet gears 50 caused by the rotation of the output sun gear 48 causes the output ring gear 64 to rotate causing joined hub 58 to rotate. Thus, the application of electrical power to motor 18 causes output shaft 26 and attached input sun gear 36 to rotate which in turn causes input planet gears to rotate around the interior of ring gear 42 which in turn rotates input carrier 46 and attached output sun gear 48 about shaft 26. The rotation of output sun gear 48 in turn causes output planet gears 50 to rotate which in turn causes output ring gear 64 and integrally joined hub 58 to rotate. A rubber wheel (not shown) is normally attached to the exterior surface 55 of hub 58 by bolts (not shown) screwed into threaded recesses 66 formed on a vertical face 68 of hub 58.

A cover 70 overlies the open exterior end of hub 58 and is retained in position by a locking ring 72 which engages a groove at the open exterior end of hub 58. An O-ring seal 74 is positioned around the edge of cover 70 to prevent lubricant from exiting and dust and construction debris from entering the planetary gear compartment 31. Also, a lip seal 76 is provided around the interior edge of hub 58 and the edge of spindle bracket 14 to prevent lubricant from exiting and dust and construction debris from entering the interior of the mechanism from the back side.

Electric motor 18 has a braking mechanism 79 contained at the exterior end of motor 18 and is covered by cover 78. The braking mechanism operates to lock shaft 26 to prevent rotation of shaft 26 when electrical power is removed from motor 18 but to release shaft 26 for rotation whenever electrical power is applied to motor 18. This locking mechanism prevents movement of the wheels any time electrical power is not being applied. Thus, if wheel motor assembly 10 is used to drive a scissor lift or other scaffolding type equipment, such equipment is locked and prevented from movement once the electrical power is removed from motor 24.

What is claimed is:

1. A steerable wheel motor assembly for moving construction lifts and scaffold equipment comprising:

a spindle bracket configured to be pivotably mounted at an upper end to the equipment for rotation about a vertical axis;

an electric motor mounted to a lower end of said spindle racket, said motor having an output shaft that rotates about an axis when electrical power is supplied to the motor, said shaft positioned through a shaft opening into a hollow interior portion of the lower end of the spindle bracket;

a substantially hollow cylindrical wheel hub mounted to said spindle bracket for rotation about a horizontal axis coincident with the axis of rotation of said output shaft; said wheel hub having an exterior surface to which a wheel can be mounted, an interior surface surrounding said hollow interior portion of the lower end of the spindle bracket, and an interior edge and an exterior edge between the exterior and interior surfaces, said hub supported for rotation by a first set of bearings positioned adjacent said interior edge of said hub, and a second set of bearings positioned inwardly from said exterior edge of said hub;

a multi-stage planetary gear system mounted around the output shaft of the motor and positioned within the hollow interior portion of spindle bracket and totally within the hollow cylindrical wheel hub between said exterior edge and said interior edge, said planetary gear system having an input sun gear positioned between said second set of bearings and said exterior edge of said hub and mounted on the output shaft of said motor so that rotation of said output shaft and input sun gear provide input mechanical force to said planetary gear system, and an output ring gear positioned between said first set of bearings and said second set of bearings and joined to the interior surface of said wheel hub, said output ring gear engaging output planetary gears of an output stage of said multistage planetary gear system so that rotation of said output planetary gears causes said output gear and wheel hub to rotate so there is an advantageous application of mechanical force through the planetary gear system directly to the wheel hub.

2. A wheel motor assembly as claimed in claim 1, wherein said motor has a brake that locks said shaft to prevent rotation when electrical power is removed from said motor and unlocks said shaft to permit rotation when electrical power is supplied to said motor.

3. A wheel motor assembly as claimed in claim 1, where in said spindle bracket is pivotably connected to a tie bar so that lateral movement of said tie bar causes said spindle bracket to pivot about the vertical axis, and lateral movement of said tie bar is controlled by a steering mechanism on said equipment so that said spindle bracket can be pivoted to steer the equipment.

4. A wheel motor assembly as claimed in claim 1, wherein said cylindrical hub has a cover plate mounted over said extent edge of said hub to enclose said hollow interior portion of the lower end of the spindle bracket.

5. A wheel motor assembly as claimed in claim 1, wherein a sliding seal is provided between said spindle bracket and the interior surface of said hub adjacent said interior edge.

6. A steerable wheel motor assembly for moving construction lifts and scaffold equipment comprising:

a spindle bracket configured to be pivotably mounted at an upper end to the equipment for rotation about a vertical axis;

an electric motor mounted to a lower end of said spindle bracket, said motor having an output shaft that rotates about an axis when electrical power is supplied to the motor, said shaft positioned through a shaft opening into a hollow interior portion of the lower end of the spindle bracket;

a first sun gear affixed to said shaft so that rotation of said shaft rotates said first sun gear;

a first ring gear positioned around said first sun gear;

first planetary gears engaging said first sun gear and said first ring gear so that rotation of said first sun gear causes said first planetary gears to rotate to circle about the axis of said shaft;

a first carrier to which said first planetary gears are mounted for rotation;

an output sun gear mounted for rotation about the axis of said shaft; said first carrier being joined to said output sun gear so that rotation of said first planetary gears cause said carrier to rotate which in turn causes said output sun gear to rotate about the axis of said shaft;

output planetary gears engaging said output sun gear and mounted for rotation to said spindle bracket so that rotation of said output sun gear causes said output planetary gears to rotate;

a substantially cylindrical wheel hub mounted to said spindle bracket for rotation about a horizontal axis coincident with the axis of rotation of said shaft; said wheel hub having an exterior surface to which a wheel can be mounted, an interior surface surrounding said hollow interior portion of the lower end of the spindle bracket and to which said first ring gear is attached, said wheel hub having an interior edge and an exterior edge between the exterior and interior surfaces, said hub supported for rotation by a first set of bearings positioned adjacent said interior edge of said hub, and a second set of bearings positioned inwardly from said exterior edge of said hub;

an output ring gear joined to the interior of said wheel hub, said output ring gear engaging said output planetary gears so that rotation of said output planetary gears causes said output ring gear and wheel hub to rotate, said first sun gear, said first ring gear, and said first planetary gears positioned between said second set of bearings and said exterior edge of said hub and, said output planetary gears and said output ring gear being positioned between said first set of bearings and said second set of bearings.

7. A wheel motor assembly as claimed in claim 6, wherein said motor has a brake that locks said shaft to prevent rotation when electrical power is removed from said motor and unlocks said shaft to permit rotation when electrical power is supplied to said motor.

8. A wheel motor assembly as claimed in claim 6, where in said spindle bracket is pivotably connected to a tie bar so that lateral movement of said tie bar causes said spindle bracket to pivot about the vertical axis, and lateral movement of said tie bar is controlled by a steering mechanism on said equipment so that said spindle bracket can be pivoted to steer the equipment.

9. A wheel motor assembly as claimed in claim 6, wherein said cylindrical hub has a cover plate mounted over said exterior edge of said hub to enclose said hollow interior portion of the lower end of the spindle bracket.

10. A wheel motor assembly as claimed in claim 6, wherein a sliding seal is provided between said spindle bracket and the interior surface of said hub adjacent said interior edge.

\* \* \* \* \*